Figure 1:
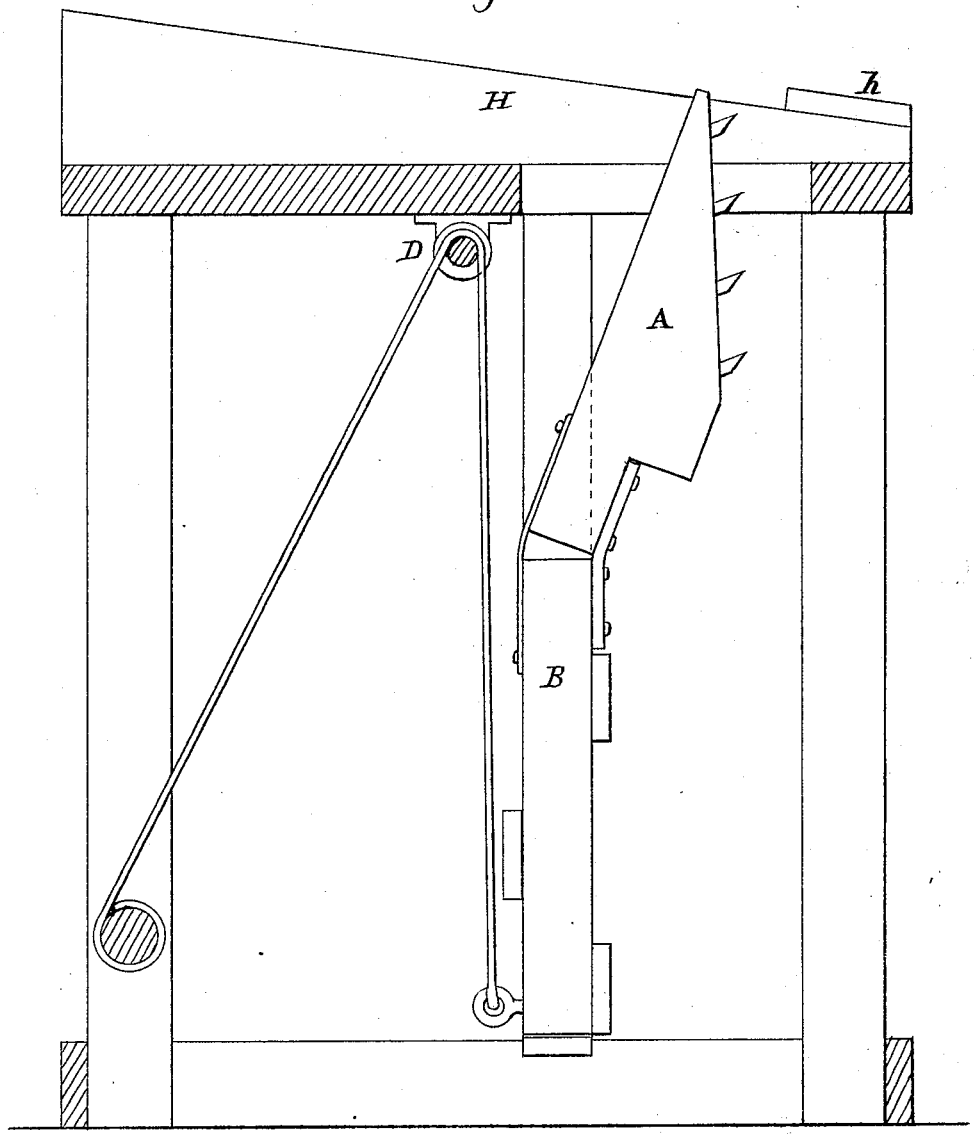

J. TORRENT.
Log-Turners.

No. 141,739.    Patented August 12, 1873.

Witnesses:
H. A. Daniels
C. H. Isham

John Torrent, Inventor,
Chas S. Whitman.    Attorney

UNITED STATES PATENT OFFICE.

JOHN TORRENT, OF MUSKEGON, MICHIGAN.

IMPROVEMENT IN LOG-TURNERS.

Specification forming part of Letters Patent No. 141,739, dated August 12, 1873; application filed January 29, 1873.

*To all whom it may concern:*

Be it known that I, JOHN TORRENT, of Muskegon, county of Muskegon and State of Michigan, have invented certain Improvements in Log-Turners. The following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new and are desired to be secured by Letters Patent of the United States.

My invention relates to that class of appliances which are made use of in saw-mills for the purpose of rolling the logs upon the carriage; and the nature thereof consists in certain improvements in the details of the construction of the same, hereinafter shown and described.

In the accompanying plate of drawings, which illustrate my invention and form a part of the specification thereof, in which corresponding parts are illustrated by similar letters, Figure 1 is a side view of a log-rolling device, partly in section.

In the drawing referred to, the toothed bar designated A is hinged or pivoted at its lower end to the upright shaft B, in order that it may adjust itself in proper position to take hold of the log and roll it to and on the carriage of the saw-mill.

As the toothed bar is raised the teeth take hold of the log and roll it to and on the carriage, after which it may be lowered and again made to adjust itself to the next log to be moved.

The said toothed bar is raised or lowered by means of a chain attached to the upright shaft B, which slides up and down in proper guides or ways. The said chain is led through a sheave, D, and over a spool or roller, upon which it may be wound by proper mechanism.

The inclined ways H are provided with stops $h$, which cause the logs rolled thereon to assume a proper position to be acted on by the said toothed bar.

Having described the construction and operation of my invention, I will state what I claim, and desire to secure by Letters Patent, in the following clauses:

1. The toothed bar, the bottom of which is pivoted to an upright reciprocating shaft, as described.

2. The combination of the inclined ways provided with a stop, $h$, the toothed bar, the upright shaft, and the chain led through a sheave and operated by a cylindrical shaft, as described.

In testimony that I claim the foregoing I have hereunto set my hand this 13th day of January, 1873.

JOHN TORRENT.

Witnesses:
JOHN J. O'LEARY,
WM. MCLAUGHLIN.